(12) United States Patent
van Rotterdam et al.

(10) Patent No.: US 11,514,074 B2
(45) Date of Patent: *Nov. 29, 2022

(54) METHOD AND SYSTEM FOR OPTIMIZING DATA REPLICATION FOR LARGE SCALE ARCHIVES

(71) Applicant: EMC IP Holding Company LLC, Hopkinton, MA (US)

(72) Inventors: Jeroen Mattijs van Rotterdam, Berkeley, CA (US); Michael T. Mohen, Millington, MD (US); Pardeep Kumar, Bangalore (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 392 days.

This patent is subject to a terminal disclaimer.

(21) Appl. No.: 16/597,036

(22) Filed: Oct. 9, 2019

(65) Prior Publication Data
US 2020/0042532 A1 Feb. 6, 2020

Related U.S. Application Data

(63) Continuation of application No. 14/871,196, filed on Sep. 30, 2015, now Pat. No. 10,482,101.

(51) Int. Cl.
*G06F 16/27* (2019.01)
*G06F 16/21* (2019.01)
*G06F 16/245* (2019.01)
*G06F 11/14* (2006.01)
*G06F 16/11* (2019.01)
*G06F 3/06* (2006.01)

(52) U.S. Cl.
CPC ............. *G06F 16/27* (2019.01); *G06F 3/065* (2013.01); *G06F 11/1469* (2013.01); *G06F 16/113* (2019.01); *G06F 16/219* (2019.01); *G06F 16/245* (2019.01)

(58) Field of Classification Search
CPC .... G06F 11/1469; G06F 16/113; G06F 3/065; G06F 16/27; G06F 16/219; G06F 16/245
USPC .......................... 707/634, 640, 652, 655, 661
See application file for complete search history.

(56) References Cited

U.S. PATENT DOCUMENTS

| 7,356,847 | B2* | 4/2008 | Byrne ..................... G06F 21/00 380/282 |
| 7,953,945 | B2* | 5/2011 | Bender ................. G06F 16/185 711/E12.001 |
| 9,100,629 | B1* | 8/2015 | Brenden ................ A63F 13/537 |
| 9,449,004 | B2* | 9/2016 | Iliev ........................ G06F 16/13 |
| 2001/0037182 | A1* | 11/2001 | Hall ..................... G01N 21/3563 702/104 |
| 2002/0078065 | A1* | 6/2002 | Agulhon ................. G06F 16/10 707/999.103 |

(Continued)

*Primary Examiner* — Phong H Nguyen
(74) *Attorney, Agent, or Firm* — Chamberlain, Hrdlicka, White, Williams & Aughtry

(57) ABSTRACT

A method and system for processing query requests, including receiving, at a secondary site, a query request from a client and executing the query request to obtain an archive replica package (ARP). The method further includes making a determination that a record associated with the ARP is not stored at the secondary site and based on the determination, transmitting a request to a primary site. The method further includes, in response to the request to the primary site, receiving an archive package and a record where the archive package is associated with the record, and providing the first record to the client.

19 Claims, 14 Drawing Sheets

(56) References Cited

U.S. PATENT DOCUMENTS

| | | | |
|---|---|---|---|
| 2003/0101167 A1* | 5/2003 | Berstis | G06F 16/10 707/999.003 |
| 2003/0177122 A1* | 9/2003 | Makansi | G06F 16/273 707/999.01 |
| 2003/0208680 A1* | 11/2003 | Byrne | H04L 69/04 705/53 |
| 2005/0108365 A1* | 5/2005 | Becker | G06F 16/51 707/E17.031 |
| 2005/0240636 A1* | 10/2005 | Shitomi | G06F 16/181 707/E17.01 |
| 2006/0031637 A1* | 2/2006 | Komikado | G06F 3/0613 711/114 |
| 2006/0080130 A1* | 4/2006 | Choksi | G06Q 99/00 705/1.1 |
| 2007/0005504 A1* | 1/2007 | Chen | G06Q 30/06 705/59 |
| 2007/0220009 A1* | 9/2007 | Morris | G06F 21/6218 707/999.01 |
| 2008/0104025 A1* | 5/2008 | Dharamshi | G06F 16/986 707/E17.118 |
| 2009/0249005 A1* | 10/2009 | Bender | G06F 11/1458 711/E12.001 |
| 2010/0228774 A1* | 9/2010 | Riemers | G06F 16/10 707/E17.032 |
| 2011/0010299 A1* | 1/2011 | Byrne | H04L 69/04 705/59 |
| 2011/0289098 A1* | 11/2011 | Oztaskent | G06F 16/43 707/769 |
| 2012/0185572 A1* | 7/2012 | Parakulam | G06F 16/27 709/219 |
| 2013/0246458 A1* | 9/2013 | Iliev | G06F 16/13 707/E17.014 |
| 2014/0075493 A1* | 3/2014 | Krishnan | H04L 67/52 726/1 |
| 2015/0215380 A1* | 7/2015 | Balacheff | H04L 63/101 709/203 |
| 2016/0132525 A1* | 5/2016 | Avery | G06F 16/148 707/769 |
| 2020/0042532 A1* | 2/2020 | van Rotterdam | G06F 16/219 |

\* cited by examiner

330 Archive Package

```
<package package_id="uuid0">
  <archive-unit uuid="uuid1">
    <record>
      <field name="field1">value 1</field>
      <field name="field2">value 2</field>
      <field name="field3">value 3</field>
      <blob uri="/a/a.pdf"/>
    </record>
  </archive-unit>
  <archive-unit uuid="uuid2">
    <record>
      <field name="field1">value 1</field>
      <field name="field2">value 2</field>
      <field name="field3">value 3</field>
      <blob uri="/b/b.jpg"/>
    </record>
    <record>
      <field name="field1">value 1</field>
      <field name="field2">value 2</field>
      <field name="field3">value 3</field>
      <field name="field4">value 4</field>
      <field name="field5">value 5</field>
    </record>
  </archive-unit>
</package>
```

FIG. 3C

340 Archive Replica Package

```
<package package_id="uuid0">
    <archive-unit uuid="uuid1">
        <record>
            <field name="field1">value 1</field>
            <field name="field2">value 2</field>
        </record>
    </archive-unit>
    <archive-unit uuid="uuid2">
        <record>
            <field name="field1">value 1</field>
            <field name="field2">value 2</field>
        </record>
        <record>
            <field name="field1">value 1</field>
            <field name="field2">value 2</field>
        </record>
    </archive-unit>
</package>
```

FIG. 3D

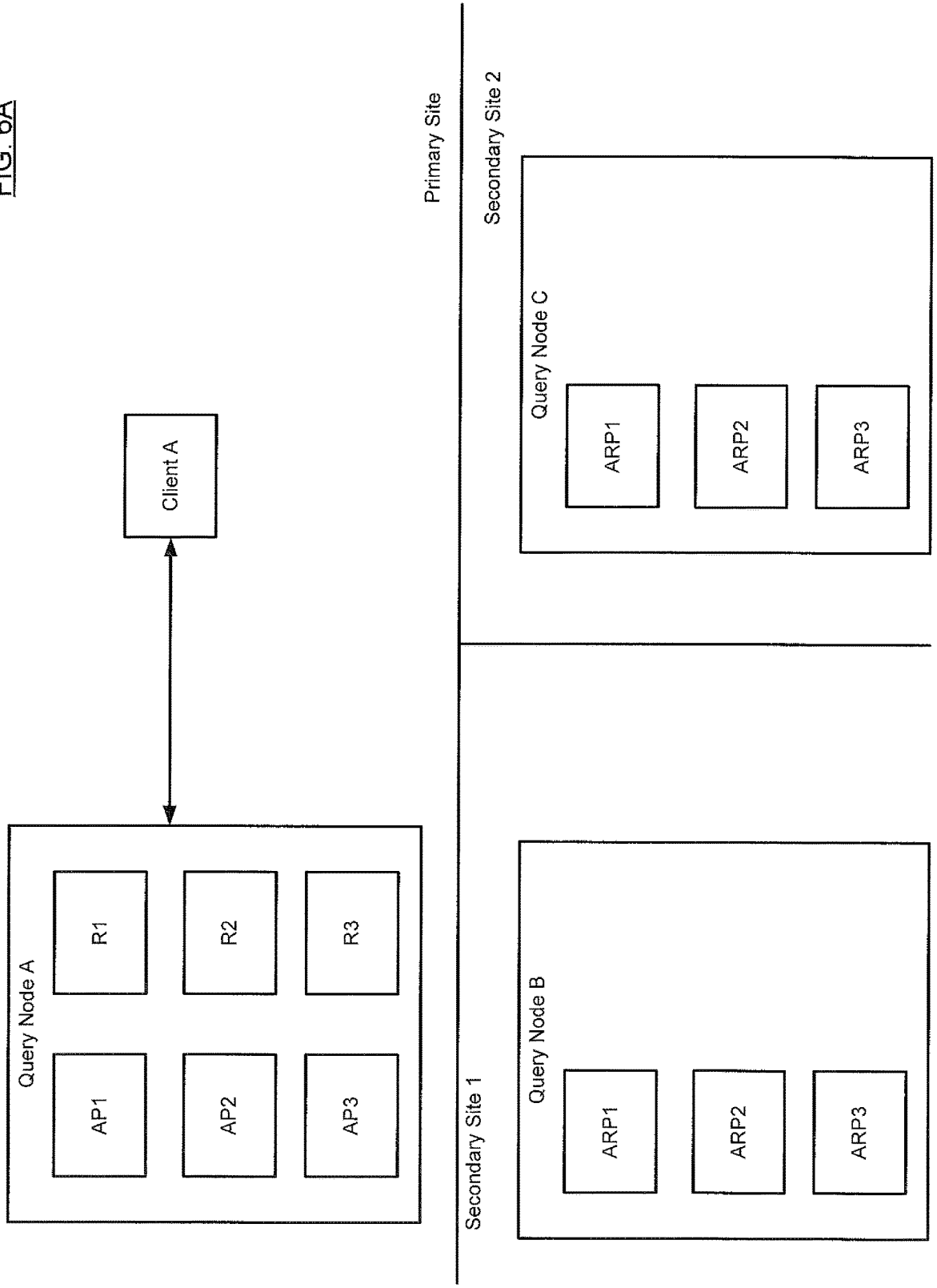

METHOD AND SYSTEM FOR OPTIMIZING DATA REPLICATION FOR LARGE SCALE ARCHIVES

CROSS-REFERENCE TO RELATED APPLICATIONS

This application is a continuation application of U.S. patent application Ser. No. 14/871,196, filed on Sep. 30, 2015, and entitled: "A METHOD AND SYSTEM FOR OPTIMIZING DATA REPLICATION FOR LARGE SCALE ARCHIVES." Accordingly, this application claims benefit of U.S. patent application Ser. No. 14/871,196 under 35 U.S.C. § 120. U.S. patent application Ser. No. 14/871,196 is hereby incorporated by reference in its entirety.

BACKGROUND

Significant amounts of content (e.g., documents, records, images, audio-visual content) are stored on computing systems. It is often the case that retrieving content consumes large amounts of bandwidth and storage (e.g. distributing information across various data centers is costly). Traditional approaches for retrieving data across large distributed systems are limited to high latency in retrieving the data and high storage overhead in maintaining multiple copies of the data.

BRIEF DESCRIPTION OF DRAWINGS

FIG. 3C shows an example of an archive package in accordance with one or more embodiments of the technology.

FIG. 3D shows an example of an archive replica package in accordance with one or more embodiments of the technology.

FIG. 6A shows an example in accordance with one or more embodiments of the technology.

DETAILED DESCRIPTION

Figure 1:
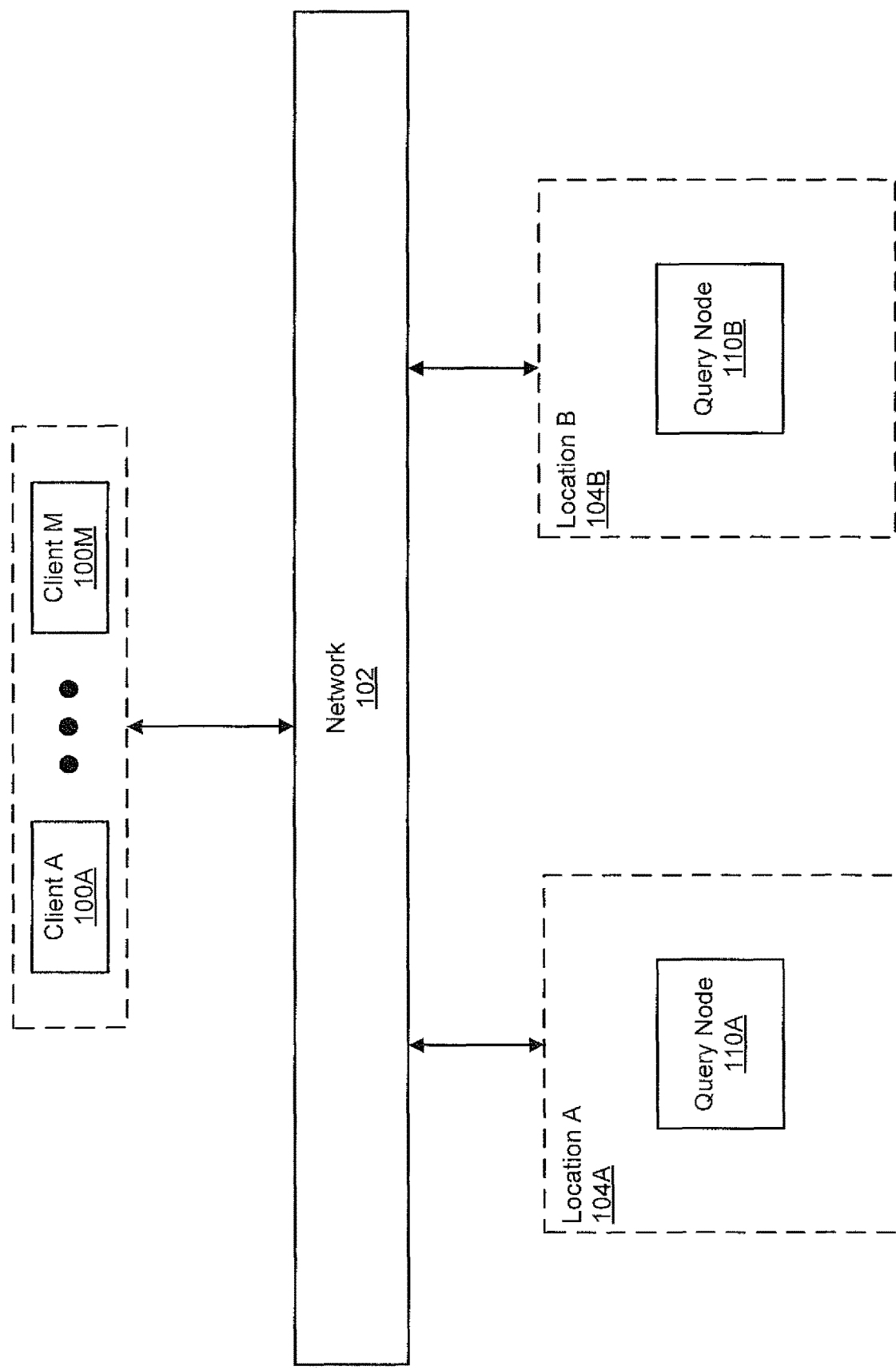
FIG. 1 shows an example system in accordance with one or more embodiments of the technology.

Specific embodiments of the technology will now be described in detail with reference to the accompanying figures. Like elements in the various figures are denoted by like reference numerals for consistency.

In the following detailed description of embodiments of the technology, numerous specific details are set forth in order to provide a more thorough understanding of the technology. However, it will be apparent to one of ordinary skill in the art that the technology may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the technology relate to replicating data across multiple locations (also referred to as sites). More specifically, one or more embodiments of the technology relate to distributing archive replication packages (also referred to as archive replica packages) between a primary site(s) and one or more secondary sites. In other words, in one or more embodiments, a primary site stores data archive packages and related records and generates archive replica packages containing subsets of the data contained in the archive packages. The archive replica packages may, for example, contain a subset of the data sufficient to allow a query at a secondary site to search for a particular data. The resulting archive replica packages may then be stored at one or more secondary sites.

In this manner, the primary site initially includes the records and corresponding archive packages (i.e., files that include metadata associated with the records) and the secondary site initially includes only the archive replica packages. In one or more embodiments of the technology, the use of archive replica packages at the secondary sites results in less storage space required at the secondary sites. Further, given that the archive replica packages are smaller in size than the corresponding archive packages, the bandwidth required to transfer the archive replica packages to the secondary sites may be substantially less than the bandwidth required to transmit the corresponding archive packages and records.

Moreover, in one or more embodiments, the archive replica packages are structured in such a manner (see e.g., FIGS. 3B and 3D) to enable clients to efficiently and effectively conduct searches on the records and the corresponding metadata (e.g., information stored in the fields in the archive replica packages) without necessarily requiring the entire archive replica package and/or the corresponding record.

FIG. 1 shows an example system in accordance with one or more embodiments of the technology.

As shown in FIG. 1, the system includes one or more clients (100A-100M), a network (102), and one or more query nodes (110A-B) in different locations (104A-B). Each of these components is described below.

Figure 3A:
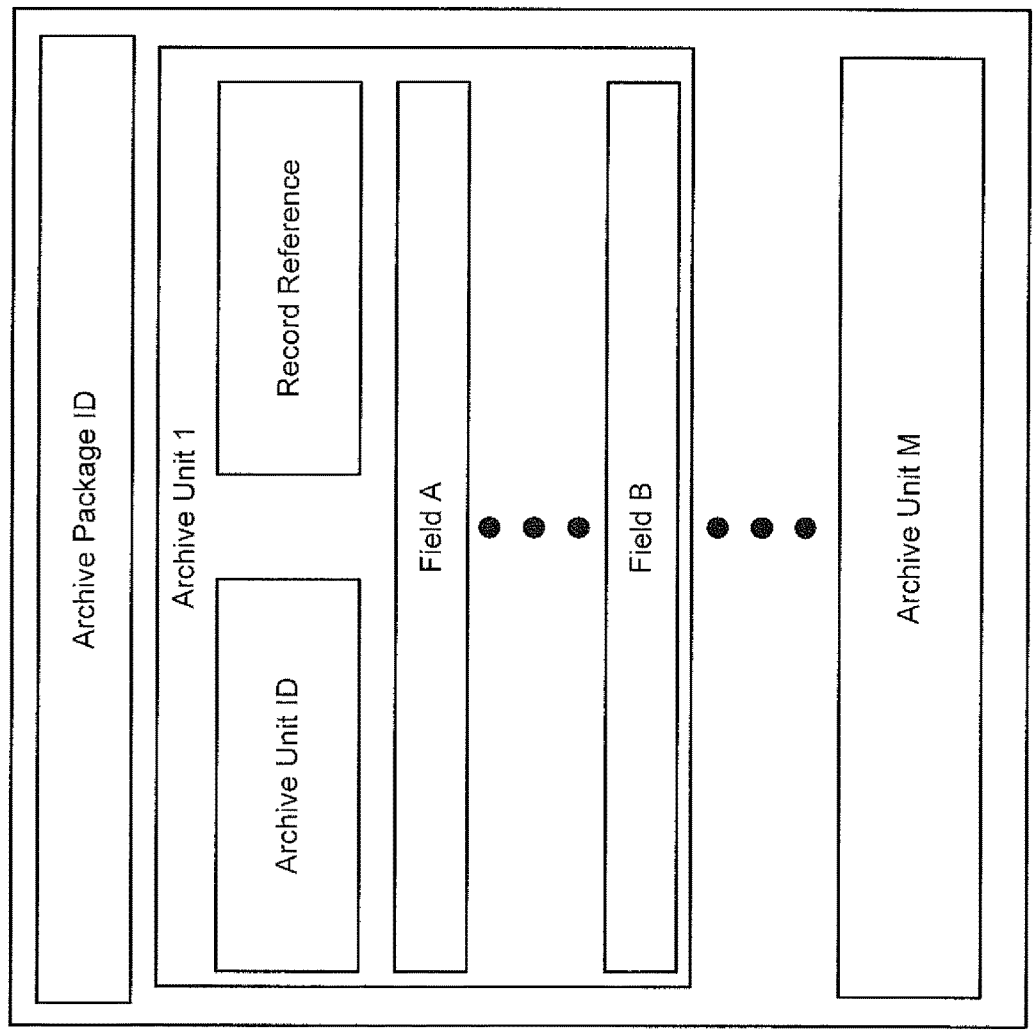
FIG. 3A shows an example of an archive package in accordance with one or more embodiments of the technology.
Figure 3B:
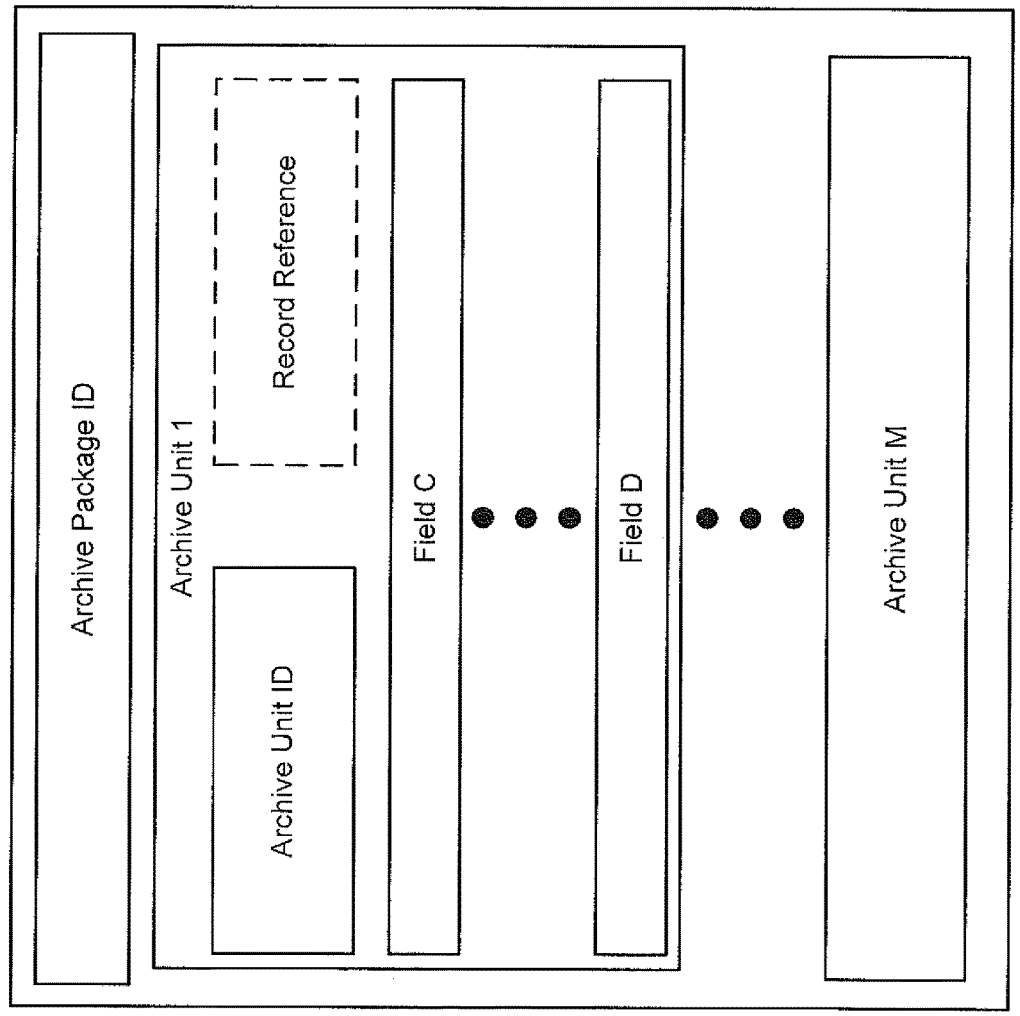
FIG. 3B shows an example of an archive replica package in accordance with one or more embodiments of the technology.
Figure 4:
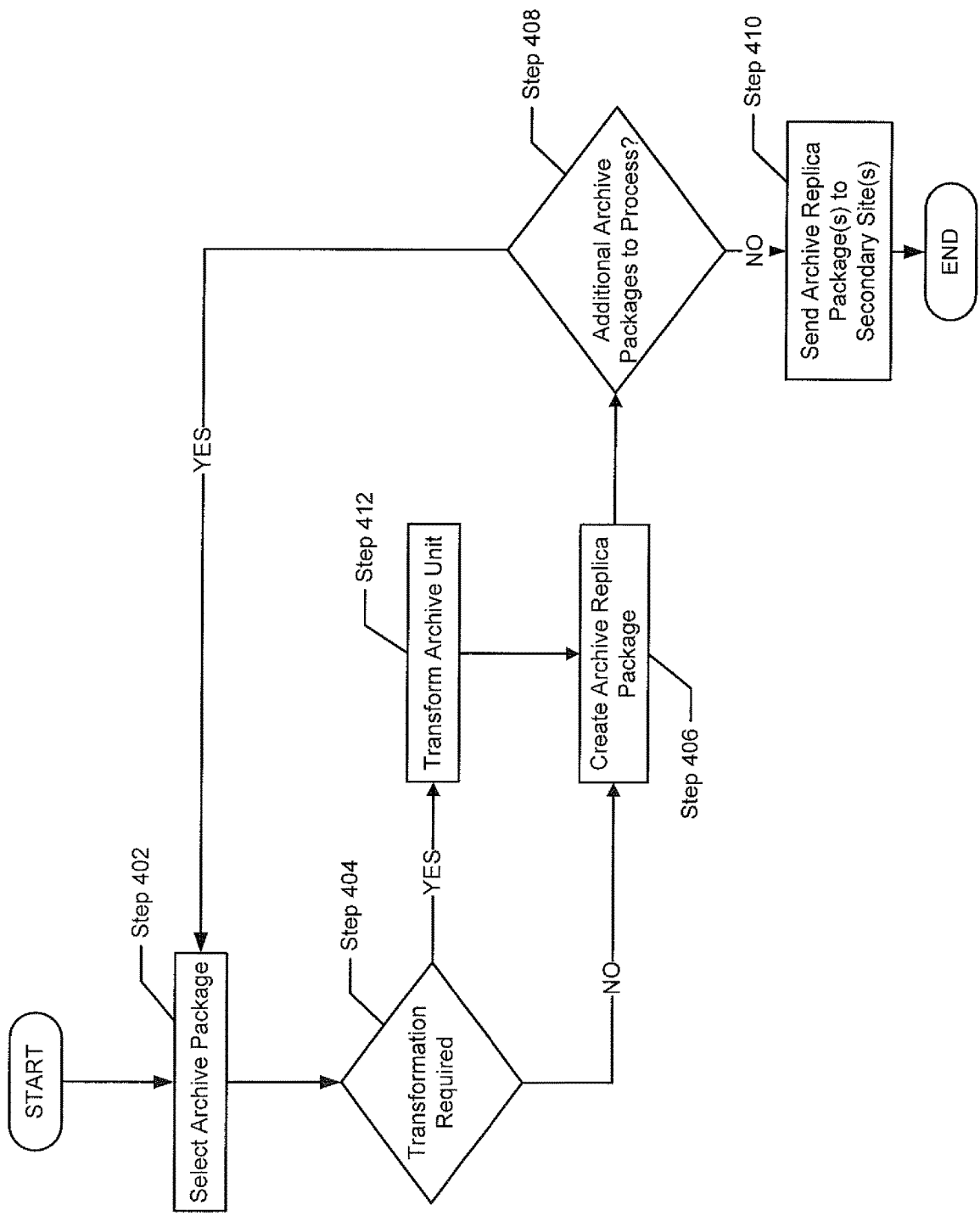
FIG. 4 shows an example method for generating archive replica packages in accordance with one or more embodiments of the technology.
Figure 5A:
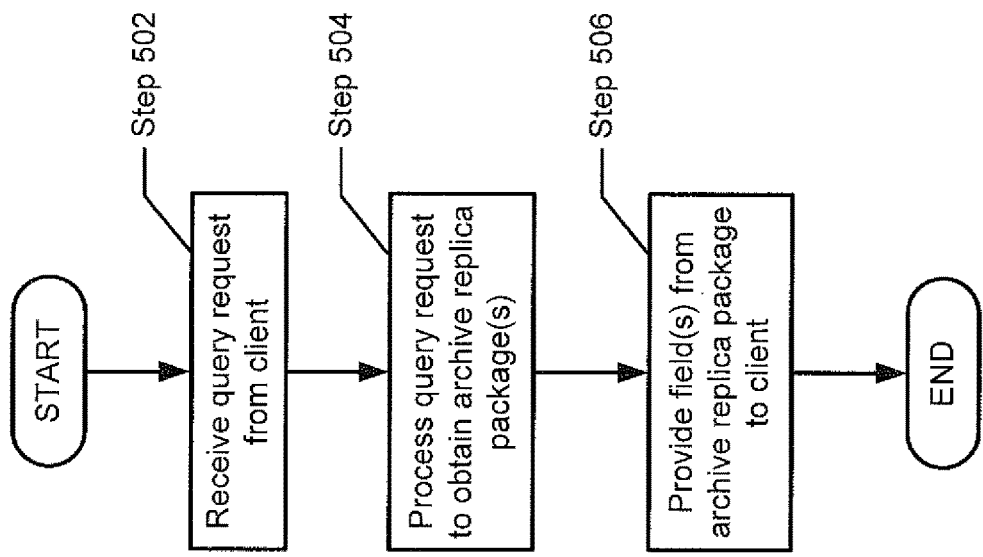
FIG. 5A shows an example method for retrieving data from the perspective of the secondary site in accordance with one or more embodiments of the technology.
Figure 5B:
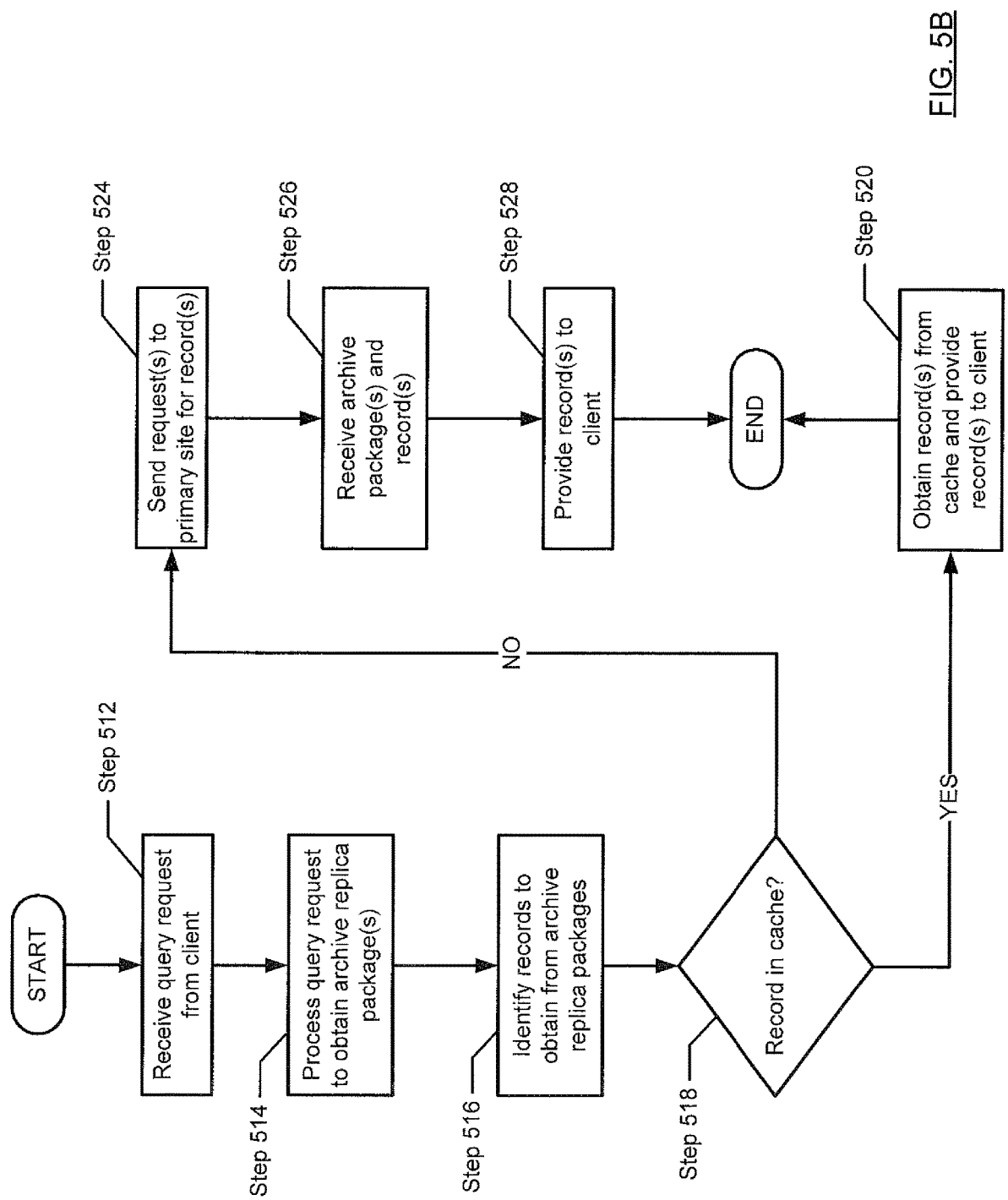
FIG. 5B shows an example method for retrieving data from the perspective of the secondary site in accordance with one or more embodiments of the technology.
Figure 5C:
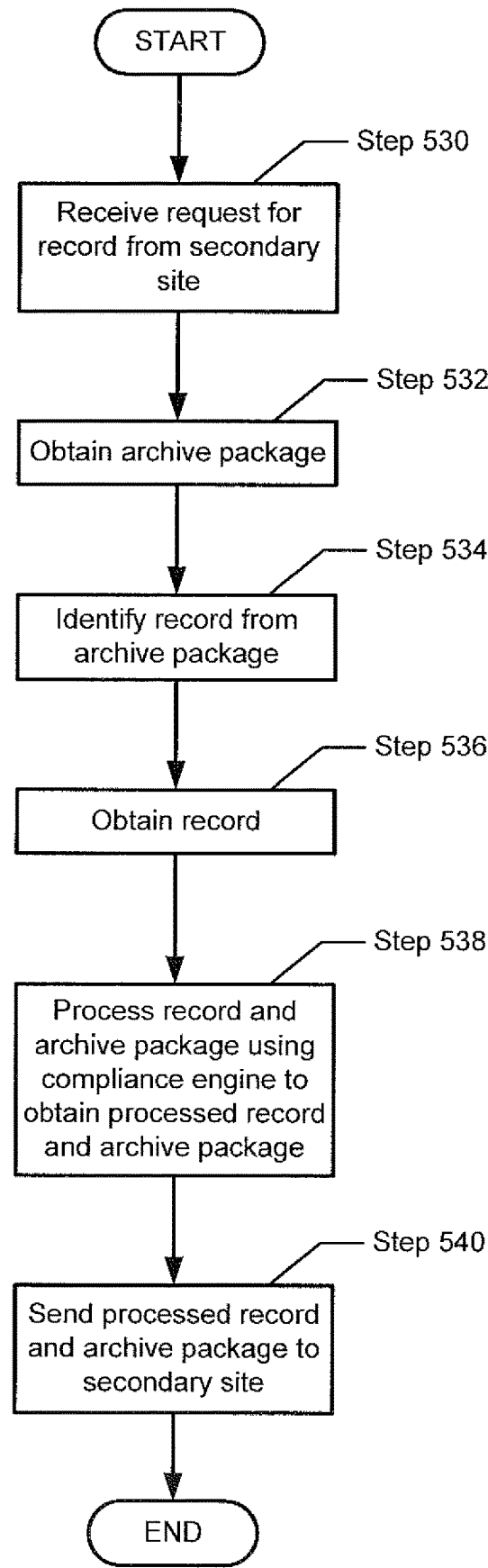
FIG. 5C shows an example method for retrieving data from the perspective of the primary site in accordance with one or more embodiments of the technology.

In one or more embodiments in accordance with FIG. 1, the query nodes (110A-B) correspond to one or more computing devices (see e.g. FIG. 8) that include functionality to process queries (see e.g., FIGS. 4-5C). Additional detail about the query nodes is provided in FIG. 2. Each of the query nodes may be denoted as a primary site or a secondary site. Query nodes that are denoted as a primary site include archive packages and the corresponding records (see e.g., FIGS. 3A, 6A-6B) while query nodes that are denoted as secondary sites include archive replica packages and potentially include archive packages and corresponding records (see e.g., FIGS. 3B, 6A-6B)

Further, while FIG. 1 shows query nodes distributed across various locations, the embodiments of the technology may be implemented using query nodes associated with given portions (e.g., departments) in a company or different divisions of a network (e.g. subnets or domains).

In one or more embodiments of the technology, a client (100A, 100M) may be any computer system or process executing on a computer system that issues a query request over to a query node (110A-B) over the network (102). The clients may also include functionality to receive and process responses from the query nodes. In one embodiment of the technology, the clients (100A, 100M) may each include a processor (not shown), memory (not shown), and persistent storage (not shown). In one embodiment of the technology, the clients may be implemented using computing devices shown in FIG. 8.

In one or more embodiments, the query nodes (110A-B) are connected via the network (102). Additionally, each of the clients (100A, 100M) may also be connected to each other or the query nodes (110A-B) through the network (102). The network (102) may be wired network, a wireless network, or any combination thereof. Further, the network (102) may be a wide area network (e.g., the Internet) or a local area network (LAN).

Figure 2:
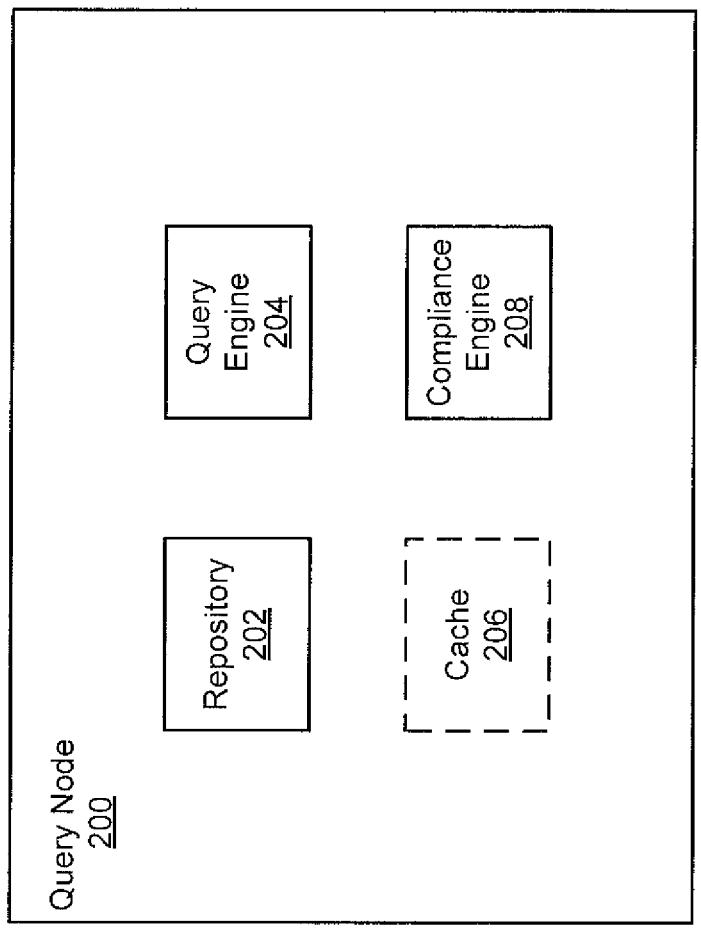
FIG. 2 shows an example of a query node in accordance with one or more embodiments of the technology.

FIG. 2 shows an example of a query node in accordance with one or more embodiments of the technology.

As shown in FIG. 2, the query node (200) may include a repository (202), a query engine (204), a compliance engine (208), and optionally a cache (206). Each of these components is described below.

In one embodiment of the technology, the repository (202) includes persistent storage (e.g., solid state storage, magnetic storage, optical storage, any other type of persistent storage or any combination thereof) in which content (described below) is stored.

Continuing with the discussion of the repositories, each repository may store content using any known or subsequently discovered mechanism. The following describes various examples of the mechanisms that may be used to store content. The examples are not intended to limit the technology. In a first example, the repository may be a set of magnetic hard disks. In a second example, the repository may be implemented using a computer cluster that is executing a distributed file system. In a third example, the repository may be implemented using a network file server and one or more block-storage devices (i.e., as a Storage Area Network).

In one or more embodiments of the technology, a cache (206), similar to the repository (202), may include persistent storage (e.g., solid state storage, magnetic storage, optical storage, any other type of persistent storage or any combination thereof) or may include volatile memory storage (e.g. Dynamic Random-Access Memory (DRAM), Synchronous DRAM, SDR SDRAM, and DDR SDRAM) in which content (described below) is stored. In one or more embodiments, a cache (206) may also temporarily store content that is to be written to persistent storage, i.e. a repository (202).

In one embodiment of the technology, the content may correspond to any type of data that may be stored in the content repository. Examples of content may include, but are not limited to, text files, audio files, image files, and/or audio-visual files. Further, the repository may also store metadata associated with the content. Examples of metadata may include, but are not limited to, author, content name, creation time, creation date, size of object, modification time, modification date, content format, e.g., portable document format (PDF), MPEG-4, .txt., etc. In one or more embodiments, content is stored or archived in accordance with the packages described in FIGS. 3A-3D.

In one or more embodiments, the query engine (204) is a service or process that includes functionality to service requests in accordance with FIGS. 4-5C below. More specifically, the query engine includes functionality to evaluate a request and determine whether any content for that request is present in the repository or in the cache. If the content is present in the repository or the cache the query engine is configured to retrieve the content from the repository. Further, the query engine may include functionality to process the retrieved content in order to determine whether to send the retrieved content to the compliance engine or send the retrieved content directly to the client that issued the request. In one embodiment of the technology, the query engine may be implemented using specialized hardware. Additional detail about the functionality of the query engine is described below in FIGS. 4-8.

In one or more embodiments, the compliance engine (208) includes functionality to enforce compliance rules. More specifically, in one or more embodiments, the compliance engine (208) maintains a repository of compliance rules. In one or more embodiments, a compliance rule specifies: (i) a requestor location, (ii) a location of data, (iii) a type of the data, and (iv) a rule to apply when conditions (i)-(ii) or (i)-(iii) are satisfied. For example, a compliance rule may pertain to the origin of the request from a remote client or node having a particular set of restrictions. Alternatively, a compliance rule may relate to the sensitivity level of the data itself.

In one embodiment of the technology, the compliance engine may define several compliance-related data manipulation rules based on the sequence of operations a particular resulting dataset has undergone. Depending on the type of data and the compliance rules that have been configured for that data, particular fields may be eliminated from the resulting dataset. Alternatively, a compliance rule may also enforce that a particular field be masked or tokenized. Further, a compliance rule may enforce that only a count of the number of entries for a particular field is returned. In other words, the compliance engine may apply the compliance rules to a retrieved dataset removing or altering data based upon the rule and ultimately create a resulting exportable dataset. Furthermore, in one or more embodiments, the compliance engine of the primary site may also apply compliance rules to archive packages or to archive replica packages prior to transmission to a secondary site. Once the compliance engine has applied any applicable compliance rules, the query node (200) transmits the exportable result (which may be a processed archive package, see e.g., FIG. 5C) to the requesting entity.

In one embodiment of the technology, the compliance rules may be based on specific geographic locations and boundaries. In one or more embodiments, the abovementioned compliance engine for a given geographic location may only execute within that geographic location, thus ensuring that sensitive data never leaves that particular jurisdiction.

As described above, in one embodiment, each query node may be implemented using one or more computing devices. In another embodiment, the query engine and the compliance engine may be implemented in a single computing device operatively connected to the repository and cache. While various examples of how the query may be implemented have been provided, those skilled in the art will appreciate that the query nodes (200) may be implemented using any combination of software and/or hardware without departing from the technology.

In one embodiment of the technology, each query node may be denoted as a primary site or a secondary site. Query nodes that are denoted as primary sites store archive packages and record (which are referenced by the archive packages). In contrast, query nodes that are denoted as secondary sites store archive replica packages along with various archive packages and records.

In one embodiment of the technology, the archive packages are organized within a hierarchy in the primary site. In such cases, the corresponding archive replica package is organized in accordance with the same hierarchy at the secondary site. Further, the secondary site includes an archive replica package for each archive package on the primary site. In one embodiment of the technology, the clients interfacing with the secondary sites are unaware that the secondary sites do not include the records and/or the archive packages.

While FIGS. 1-2 show a configuration of components, other configurations may be used without departing from the scope of the technology. For example, various components may be combined to create a single component. As another example, the functionality performed by a single component may be performed by two or more components.

Further, while FIGS. 1-2 show a single query node per location, each location may have multiple query nodes. Further, each query node may have multiple repositories, multiple compliance engines, multiple query engines, and multiple caches.

FIG. 3A shows an example of an archive package (AP) in accordance with one or more embodiments of the technology.

As shown in FIG. 3A, an Archive Package (300) has an Archive Package ID and one or more Archive Units (1-M). Each Archive Unit has an Archive Unit ID, a Record Reference, and one or more Fields (A-B). In one or more embodiments, each Archive Package ID and Archive Unit ID is a unique identifier, e.g. a Universally Unique Identifier (UUID) or a Globally Unique Identifier (GUID). The archive package ID unique identifies the archive package, while the archive unit ID uniquely identifies the archive unit within the archive page. Accordingly, the archive unit ID may be GUID or may only be unique with respect to other archive units within the archive package.

In one or more embodiments, a Record Reference corresponds to a reference to the record (also referred to as content) that is described by the archive unit. The record reference may be a location identifier, e.g. a Uniform Resource Identifier (URI) or a Uniform Resource Locator (URL). In other words, in one or more embodiments a Record Reference may refer to a particular piece of content.

As discussed above, examples of content may include, but are not limited to, text files, audio files, image files, and/or audio-visual files.

In one or more embodiments, the one or more Fields (A-B) may contain metadata about the content (or record) referred to by the Record Reference. For example, Fields (A-B) may include, but are not limited to, content name, creation time, creation date, size of object, modification time, modification date, content format, e.g., portable document format (PDF), MPEG-4, .txt., etc., as discussed above.

Additionally or alternatively, in one embodiment of the technology, fields in the archive unit may include information related to the specific information in the record (i.e., the record that may be located/obtained using the record reference) and/or information about a transaction (or event) with which the record is associated.

For example, a bank may store values related to a transaction in one or more of the Fields (A-B) such as account numbers or dollar values. Further, an image of a check may be referenced by the Record Reference for a particular transaction. Thus, in one or more embodiments in accordance with the aforementioned example, a bank manager may search for a given transaction or amount by a transaction ID or account number and retrieve an associated check image by accessing the location specified by the Record Reference.

FIG. 3B shows an example of an archive replica package (ARP) in accordance with one or more embodiments of the technology.

As shown in FIG. 3B, an Archive Replica Package (320) has an Archive Package ID and one or more Archive Units (1-M). Each Archive Unit has an Archive Unit ID, optionally a Record Reference, and one or more Fields (C-D). In one or more embodiments, each Archive Package ID and Archive Unit ID is a unique identifier, e.g. a Universally Unique Identifier (UUID) or a Globally Unique Identifier (GUID). In one or more embodiments, the Archive Package ID corresponds to an Archive Package that was used to generate the Archive Replica Package (320).

In one or more embodiments, a Record Reference may be a location identifier, e.g. a Uniform Resource Identifier (URI) or a Uniform Resource Locator (URL). In other words, in one or more embodiments a Record Reference may refer to a particular piece of content. Further, because an Archive Replica Package (320) may contain a subset of the data from its corresponding Archive Package (300), an ARP (320) may or may not have a Record Reference.

In one or more embodiments, the one or more Fields (C-D) may contain metadata about the content referred to by the Record Reference. As discussed above, in one or more embodiments, the Fields (C-D) may contain searchable values. Further, because an Archive Replica Package (320) may only contain a subset of the data from the corresponding Archive Package (300), Fields (C-D) may be a subset of Fields (A-B) from an Archive Package (300). In one embodiment of the technology, the fields in the archive replica package may be selected to facilitate efficient searching of the archive replica packages (see e.g., FIG. 5A-5B).

FIG. 3C shows an example of an archive package in accordance with one or more embodiments of the technology.

As shown in FIG. 3C, an Archive Package (330) may be represented in an eXtensible Markup Language (XML). Those skilled in the art will appreciate that other languages may be used to implement the archive packages without departing from the technology. In one or more embodiments in accordance with FIG. 3C, an Archive Package (330) has an Archive Package ID value of "uuid0," a first Archive Unit having a uuid value of "uuid1," and a second Archive Unit having a uuid value of "uuid2". In this example, the first Archive Unit includes information about a single record where the information is specified in three fields. The first archive unit further includes a record reference (i.e., "/a/a/a.pdf.") to a PDF document named a.PDF. The three fields are labeled "field1," "field2," and "field3" each having a value: "value 1," "value 2," and "value 3," respectively.

The second Archive Unit archive unit specifies information about has two records. Information about the first record in the second Archive Unit is specified using the three fields labeled "field1," "field2," and "field3" each having a value: "value 1," "value 2," and "value 3," respectively. The first record of the second Archive Unit also has record reference to a JPG file at location "/b/b/b.jpg." Information about the second record in the second Archive Unit is specified using five fields labeled "field1," "field2," "field3," "field4," and "field5" each having a value: "value 1," "value 2," "value 3," "value 4," and "value 5," respectively.

FIG. 3D shows an example of an archive replica package in accordance with one or more embodiments of the technology. The archive replica package shown in FIG. 3D is generated using the archive package shown in FIG. 3C.

As shown in FIG. 3D an Archive Replica Package (340) may be represented in an eXtensible Markup Language (XML). Those skilled in the art will appreciate that other languages may be used to implement the archive replica packages without departing from the technology. In one or more embodiments in accordance with FIG. 3D, an Archive Replica Package (340) has an Archive Package ID value of "uuid0," a first Archive Unit having a uuid value of "uuid1," and a second Archive Unit having a uuid value of "uuid2". In this example, the first Archive Unit includes information about a single record that is specified in two fields: "field1" and "field2" and each have a value: "value 1" and "value 2," respectively.

The second Archive Unit archive unit includes information about two records. Information about the first record in the second Archive Unit is specified using two fields named "field1" and "field2" each have a value: "value 1" and "value 2," respectively. Information about the second record in the second Archive Unit is specified using two fields named "field1" and "field2" each have a value: "value 1" and "value 2," respectively. In one or more embodiments, field1 and field2 are used in order to service query requests at secondary sites (see e.g., FIGS. 5-A-5B).

While the various steps in the following flowcharts are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the technology. By way of an example, determination steps may not require a processor to process an instruction unless an interrupt is received to signify that condition exists in accordance with one or more embodiments of the technology. As another example, determination steps may be performed by performing a test, such as checking a data value to test whether the value is consistent with the tested condition in accordance with one or more embodiments of the technology.

FIG. 4 shows an example method for generating archive replica packages in accordance with one or more embodiments of the technology. The method shown in FIG. 4 may be implemented, for example, using the system shown in FIG. 1.

Turning to FIG. 4, in step 402, the query node (i.e. a primary site query node) selects an Archive Package for processing. In one or more embodiments, the query node may select a particular Archive Package or set of Archive packages based upon, e.g. a queue or a priority value.

In step 404, the query node determines whether a transformation is required for the archive package. If no transformation is required, the process proceeds to step 406. If the archive package does require transformation, the process proceeds to step 412.

Turning to step 406, if the archive package does not require transformation (i.e. it is already in a state to be sent to another site or the other site requires the entire archive package), the query node creates an archive replica package from the archive package. After creation of the archive replica package, the process proceeds to step 408.

Turning back to step 412, if the archive package does require transformation, the query node processes the archive package. For example, in one or more embodiments, one or more fields may need to be removed from the archive package to enforce compliance rules (described above) and/or to reduce the size of a dataset. In one or more alternative embodiments, record references may also be removed from the archive package to reduce size. Further, in one or more embodiments, the query node may retain only fields required for indexing and/or searching the archive replica packages (see e.g., FIGS. 5A-5B).

In step 406, the query node creates an archive replica package from the transformed archive package. After creation of the archive replica package, the process proceeds to step 408.

In step 408, the query node determines whether there are additional archive packages to process. If there are additional archive packages to process, the process returns to step 402. If there are no additional archive packages to process, the process proceeds to step 410 and the query node sends the one or more archive replica packages to one or more secondary sites and the process ends.

In one or more embodiments, the query node may transmit archive replica packages to the secondary sites as they are generated. In one or more alternative embodiments, the query node may aggregate a set of archive replica packages prior to transmission to one or more secondary sites. Additionally, in one or more embodiments, different archive replica packages may be sent to different secondary sites depending on a variety of factors including, but not limited to, compliance requirements, data usage at the secondary site(s), and/or bandwidth restrictions.

In one embodiment of the technology, the primary site may proactively send archive replicas and the corresponding records to one or more secondary sites based on, for example, analytics information associated with the second site(s). The analytics information may indicate, for example, that certain secondary sites receive query requests for certain types of records. Based on this determination, records of the identified type (e.g., payroll records) may be proactively sent to one or more secondary sites.

FIG. 5A shows an example method for retrieving data in accordance with one or more embodiments of the technology. The method shown in FIG. 5A may be implemented, for example, using the system shown in FIG. 1.

Turning to FIG. 5A, in step 502, the query node receives a request (also referred to as a query request) for data. The request may be received from a requestor, which may be a client, a query node, or another external entity. In this embodiment the query request may specify that only information from fields in various archive replica packages is obtained.

In step 504, the query node processes the request to obtain one or more archive replica packages. In one or more embodiments, the query node uses the query engine to process the request and identify archive replica packages that includes one or more fields that satisfy the request.

In step 506, the query node provides the requested one or more fields from the archive replica package to the client and the process ends.

FIG. 5B shows an example method for retrieving data in accordance with one or more embodiments of the technology. The method shown in FIG. 5B may be implemented, for example, using the system shown in FIG. 1.

Turning to FIG. 5B, in step 512, the query node receives a request (also referred to as a query request) for data. The request may be received from a requestor, which may be a client, a query node, or another external entity. In this embodiment the requestor is attempting to obtained records (as opposed to only fields from archive replica packages).

In step 514, the query node processes the request to obtain one or more archive replica packages. In one or more embodiments, the query node uses the query engine to process the request identify archive replica packages that includes one or more fields that satisfy the request. In step 516, the query node may attempt to identify requested record(s) to obtain based on information in the archive replica packages. In one or more embodiments, archive replica packages may include record references. In another embodiment of the technology, the archive replica packages obtained in step 514 may be used to identify corresponding archive packages that may have been previously obtained from the primary site. Once the corresponding archive packages are identified, the corresponding archive packages may be evaluated to obtain a record reference. The record reference may then be used to determine whether the record is present at the secondary site (e.g., in the cache or in a repository at the secondary site).

In step 518, the query node determines whether the requested record(s) are stored in the cache. If the requested records are stored in the cache, the process proceeds to step 520. In step 520, the requested record(s) are obtained from the cache and provided to the client and the process ends.

Turning back to step 518 in the case that the records are not stored in the cache, the process proceeds to step 524. In step 524, the query node sends one or more requests to one or more primary sites for the requested record(s). The request may include the archive unit ID and/or the <archive package ID, archive unit ID>. The primary site may process the aforementioned request in accordance with FIG. 5C.

In step 526, the query node receives the archive package(s) and the requested record(s) from the one or more primary sites. In step 528, the query node provides the requested record(s) to the requestor and the process ends.

In one or more embodiments, the method shown in FIG. 5B facilitates the creation of multiple copies of the records and archive packages on secondary sites. More specifically, the method shown in FIG. 5B enables migration (or copying of content) from the primary site to the secondary sites in a manner that only copies content that is actually used by clients interfacing with the secondary site. In this manner, the content (i.e., archive packages and the corresponding records) may be copied, as needed, from the primary site to one or more secondary sites.

FIG. 5C shows an example method for retrieving data from the perspective of the primary site in accordance with one or more embodiments of the technology. The method shown in FIG. 5C may be implemented, for example, using the system shown in FIG. 1.

Turning to FIG. 5C, in step 530, the query node (i.e. a primary site) receives a request (also referred to as a query request) for one or more records from a secondary site. In step 532, the query node obtains the archive package in response to the query request.

In step 534, the query node identifies the requested record(s) in the obtained archive package using the record references in the archive packages. In step 536, the query node obtains the requested record(s) from the repository at the primary site. In step 538, the query node processes the requested record(s) and archive packages using the compliance engine to obtain a processed record and archive package (i.e. a compliant resulting dataset). In one or more embodiments, the compliance engine retrieves any compliance rules related to, for example, the location of the requestor or the sensitivity level of the data. The compliance engine then applies the compliance rules to create an exportable result. Also as discussed above, this may entail the compliance engine removing portions of the data not allowed to be transmitted, masking portions of the data, or otherwise modifying the data package to enforce compliance regulations.

In step 540, the processed records and archive packages are sent to the requesting secondary site and the process ends.

The following sections describe various examples in accordance with one or more embodiments of the technology. The examples are not intended to limit the scope of the technology.

FIG. 6A shows an example in accordance with one or more embodiments of the technology.

In this example, there is a primary site and two secondary sites. The primary site has a query node, Query Node A. In the repository of Query Node A is stored archive packages AP1, AP2, and AP3, as well as records R1, R2, and R3.

Secondary Site includes Query Node B and secondary site 2 has Query Node C. Each of Query Node B and Query Node C has stored in its repository archive replica packages ARP1, ARP2, and ARP3. Each of ARP1, ARP2, and ARP3 has been transmitted to the secondary sites by Query Node A in the primary site. In other words, Query Node A has generated ARP1, ARP2, and ARP3, from AP1, AP2, and AP3, respectively, according to, for example, the process described in FIG. 4.

Figure 6B:
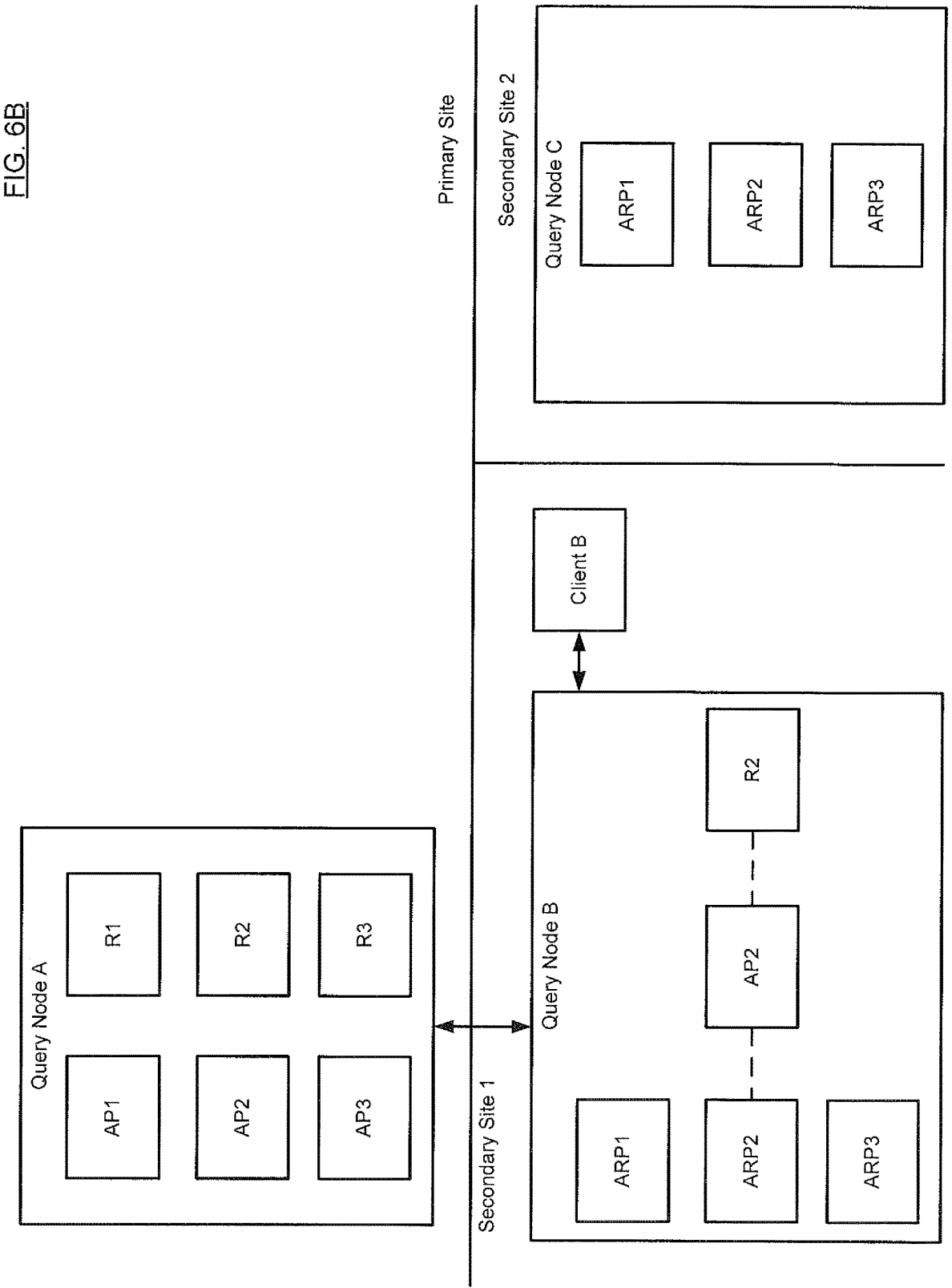
FIG. 6B shows an example in accordance with one or more embodiments of the technology.

A client, Client A, resides in the primary site. Thus, in one or more embodiments in accordance with FIG. 6A, Client A transmits query requests directly to Query Node A in the primary site. In other words, Query Node A has the original archive packages that are available for retrieval. For example, Client A may send a query request to Query Node A that specifies one or more fields. As discussed above, the query node may use a query engine (not shown) to process the request by searching for the relevant index fields to service the request. In one or more embodiments, the query engine may, for example, determine which archive packages contain fields matching fields in the query request. In one or more embodiments, Query Node A obtains the archive package containing matching fields. In this example, the archive package is AP1. The record reference in the AP1 is subsequently used to obtain R1 from the repository at the primary site. R1 is subsequently provided to client A FIG. 6B shows an example in accordance with one or more embodiments of the technology. Continuing with the examples from FIG. 6A, a client, Client B, resides in the Secondary Site 1. Thus, in one or more embodiments in accordance with FIG. 6B, Client B transmits query requests directly to Query Node B in its secondary site. In other words, Query Node B has the archive replica packages that are available for querying. For example, Client B may send a request to Query Node B that specifies one or more fields associated with R2. As discussed above, the query node may use a query engine (not shown) to process the request by searching for the relevant index fields to service the request. In one or more embodiments, the query engine may, for example, determine which archive replica packages contain fields matching fields in the query request. In this example, Query Node B obtains the archive replica package ARP2.

In one or more embodiments, the ARP2 may already include all of the fields associated with R2 that are requested by Client B. In this case, Query Node B transmits the requested fields to Client B (See e.g. FIG. 5A).

However, in the case that ARP2 does not contain all of the fields in R2 requested by the client, Query Node B sends a request to Query Node A in the primary site for the corresponding archive package (i.e. AP2). In one or more embodiments, Query Node A obtains archive package AP2 and identifies the requested records (i.e. R2). Further, Query Node A optionally processes the record and archive package using its compliance engine (not shown) to obtain a processed record(s) and archive package, which is then sent to Query Node B (See e.g. FIG. 5C).

Query Node B receives the processed record(s) and archive package, R2 and AP2, which it then stores in its cache. In one or more embodiments, either of AP2 or R2 may be maintained in a cache (not shown). In one or more alternative embodiments, either of AP2 or R2 may be stored directly in the repository (not shown) of Query Node B. In one or more embodiments, AP2 and/or R2 may be maintained in a cache (not shown), until a condition is met such that they are written to permanent storage in the repository of Query Node B. The Query Node B may then the request fields related to R2 directly to Client B. In one or more embodiments, Query Node B obtains the one or more requested fields the processed archive package received from the query node A (i.e., from the primary site). As discussed above, in one or more embodiments AP2 and/or R2 may be cached and thus, a second request for either of AP2 or R2 may not necessitate the transmission of a request to the Query Node A in the primary site.

Figure 7:
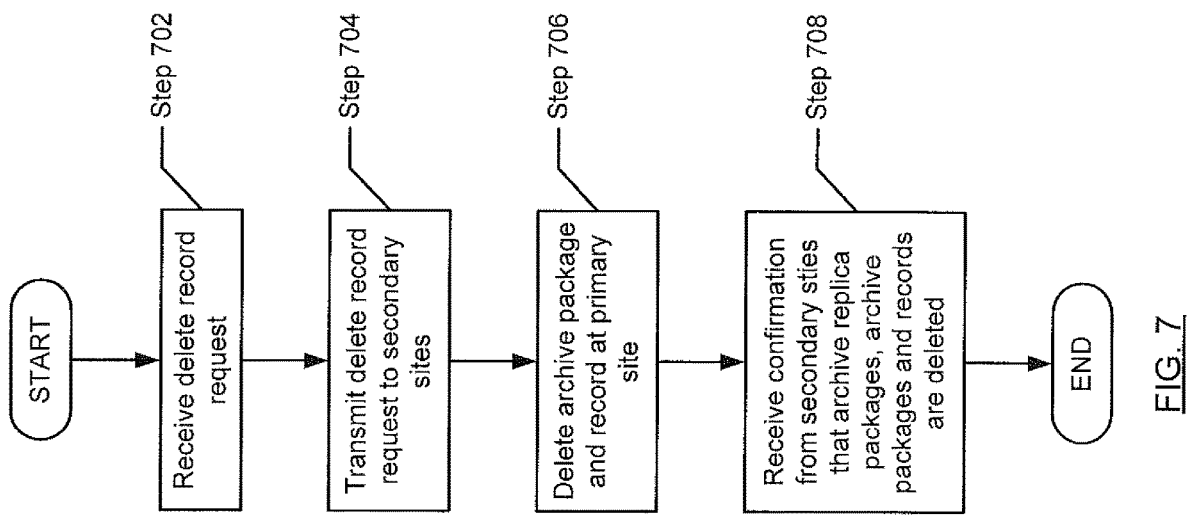
FIG. 7 shows an example method for deleting data in accordance with one or more embodiments of the technology.

FIG. 7 shows an example method for deleting data in accordance with one or more embodiments of the technology. The method shown in FIG. 7 may be implemented, for example, using the system shown in FIG. 1.

Turning to FIG. 7, in step 702, the query node (i.e. a query node of a primary site) receives a delete record request for one or more records. In step 704, the query node transmits the delete record request to one or more secondary sites.

In step 706, the query node deletes the records from the repository in the primary site. In one or more embodiments, the query node may also delete the archive package corresponding to the records from the repository in the primary site.

In step 708, the query node at the primary site receives confirmation from the one or more secondary sites that the corresponding archive replica packages, archive packages, and records are deleted and the process ends.

In one or more embodiments, a record of any queries executed by the query nodes may be maintained in local or global logs depending on compliance restrictions. In one or more embodiments, the result dataset is stored together with the applied compliance rules and the field operation audit log as proof that the compliance rules were enforced during query operations.

In one or more embodiments, one or more query nodes in one or more primary sites may monitor usage and bandwidth patterns to proactively transmit compliant archive packages, archive replica packages, or records to one or more secondary sites. In other words, the query nodes may anticipate need for certain archive packages and/or records at the secondary sites. Alternatively, the query nodes may transmit archive packages, archive replica packages, or records during periods of low activity. In addition or, as an alternative, in one or more embodiments the secondary sites may monitor usage and bandwidth patterns to proactively request compliant archive packages, archive replica packages, or records from the one or more primary sites.

Figure 8:
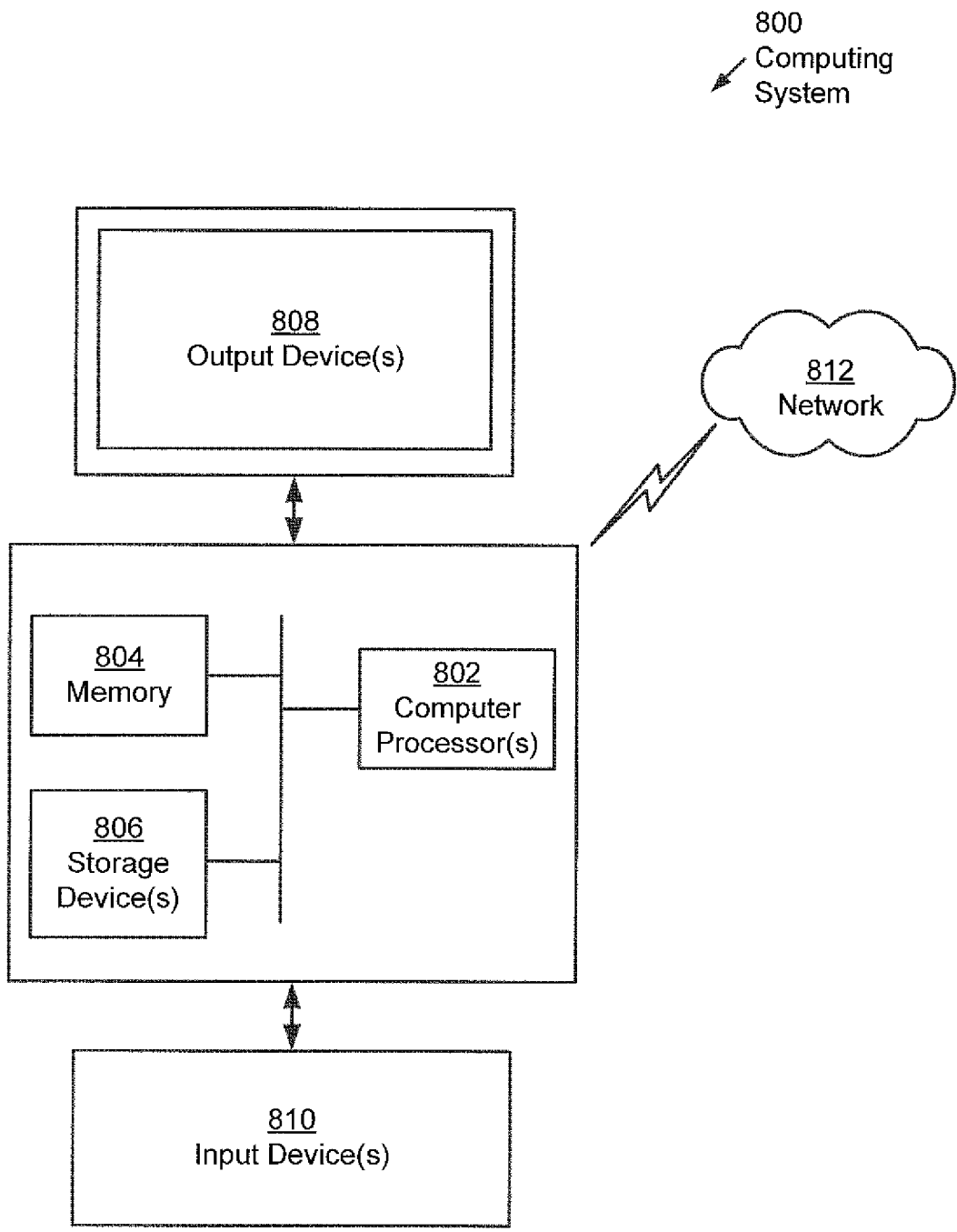
FIG. 8 shows a computing system in accordance with one or more embodiments of the technology.

FIG. 8 shows a computing system in accordance with one or more embodiments of the technology.

Embodiments of the technology may be implemented on a computing system. Any combination of mobile, desktop, server, embedded, or other types of hardware may be used. For example, as shown in FIG. 8, the computing system (800) may include one or more computer processor(s) (802), associated memory (804) (e.g., random access memory (RAM), cache memory, flash memory, etc.), one or more storage device(s) (806) (e.g., a hard disk, an optical drive such as a compact disk (CD) drive or digital versatile disk (DVD) drive, a flash memory stick, etc.), and numerous other elements and functionalities. The computer processor(s) (802) may be an integrated circuit for processing instructions. For example, the computer processor(s) may be one or more cores, or micro-cores of a processor. The computing system (800) may also include one or more input device(s) (810), such as a touchscreen, keyboard, mouse, microphone, touchpad, electronic pen, or any other type of input device. Further, the computing system (800) may include one or more output device(s) (808), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (800) may be connected to a network (812) (e.g., a local area network (LAN), a wide area network (WAN) such as the Internet, mobile network, or any other type of network) via a network interface connection (not shown). The input and output device(s) may be locally or remotely (e.g., via the network (812)) connected to the computer processor(s) (802), memory (804), and storage device(s) (806). Many different types of computing systems exist, and the aforementioned input and output device(s) may take other forms.

Software instructions in the form of computer readable program code to perform embodiments of the technology may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the technology.

Further, one or more elements of the aforementioned computing system (800) may be located at a remote location and connected to the other elements over a network (812).

Further, embodiments of the technology may be implemented on a distributed system having a plurality of nodes, where each portion of the technology may be located on a different node within the distributed system. In one embodiment of the technology, the node corresponds to a distinct computing device. Alternatively, the node may correspond to a computer processor with associated physical memory. The node may alternatively correspond to a computer processor or micro-core of a computer processor with shared memory and/or resources.

While the technology has been described with respect to a limited number of embodiments, those skilled in the art, having benefit of this disclosure, will appreciate that other embodiments can be devised which do not depart from the scope of the technology as disclosed herein. Accordingly, the scope of the technology should be limited only by the attached claims.

What is claimed is:

1. A method for processing query requests, comprising:
   selecting, by a computer processor of a first query node at a primary site, a first archive package (AP) from a plurality of APs;
   making a determination that the first AP requires a transformation;
   generating, based on the determination, an archive replica package (ARP) from a first transformed AP,
      wherein the first transformed AP is obtained by processing the first AP;
   transmitting the ARP to a second query node at a first secondary site;
   receiving a first query request from the second query node at the first secondary site;
   executing the first query request to obtain the first AP;
   processing the first AP to obtain a first record; and
   transmitting, in response to the first query request, the first AP and the first record to the second query node at the first secondary site.

2. The method of claim 1, wherein the first query request comprises an archive unit identifier (ID), wherein the first AP comprises an archive unit comprising the archive unit ID.

3. The method of claim 2, wherein the archive unit further comprises a record reference referring to a location of the first record, wherein processing the first AP to obtain the first record, comprises:
   examining the archive unit to identify the record reference; and
   retrieving, based on the record reference, the first record from a repository on the first query node.

4. The method of claim 3, wherein processing the first AP to obtain the first record, further comprises:
   obtaining a compliance rule targeting the first record; and
   applying the compliance rule to the first record to obtain a first processed record,
   wherein the first processed record is transmitted to the second query node at the first secondary site in place of the first record.

5. The method of claim 4, wherein the compliance rule relates to one selected from a group consisting of a geographical location of the second query node and a sensitivity level of the first record.

6. The method of claim 4, wherein when applied to the first record to obtain the first processed record, the compliance rule enforces at least one from a group consisting of an elimination of a first field from the first record, a masking of a second field in the first record, and a return of a count of a number of entries for a third field, instead of the third field, in the first record.

7. The method of claim 1, further comprising:
   prior to generating the ARP:
      selecting a second AP from the plurality of APs;
      making a second determination that the second AP does not require another transformation,
   after generating the ARP:
      generating, based on the second determination, a second ARP from the second AP; and
      transmitting the second ARP to the second query node at the first secondary site.

8. The method of claim 1, wherein processing the first AP to obtain the first transformed AP, comprises at least one selected from a group consisting of removing a field from the first AP, removing a record reference from the first AP, and retaining fields in the first AP required for indexing the first ARP.

9. The method of claim 1, further comprising:
   transmitting the ARP to a third query node at a second secondary site.

10. The method of claim 1, further comprising:
    processing, based on the determination, the first AP to obtain a second transformed AP;
    generating a second ARP from the second transformed AP; and
    transmitting the second ARP to a third query node at a second secondary site.

11. The method of claim 10, wherein a first compliance rule is enforced on the first AP to obtain the first transformed AP, wherein a second compliance rule is enforced on the first AP to obtain the second transformed AP.

12. The method of claim 11, wherein the first compliance rule relates to a first geographical location of the second query node, wherein the second compliance rule relates to a second geographical location of the third query node.

13. The method of claim 1, further comprising:
    identifying a second AP based on analytics information associated with the first secondary site;
    processing the second AP to obtain a second record; and
    transmitting, irrespective of the first query request, the second AP and the second record to the second query node at the first secondary site.

14. The method of claim 1, wherein a second record is further obtained from processing the first AP, wherein the second record is further transmitted to the second query node at the first secondary site in response to the first query request.

15. The method of claim 1, further comprising:
    receiving, by the first query node at the primary site, a second query request from a third query node at a second secondary site;
    executing the second query request to obtain a second AP;
    processing the second AP to obtain a second record; and
    transmitting, in response to the second query request, the second AP and the second record to the third query node at the second secondary site.

16. A system, comprising:
    a plurality of query nodes operatively connected to one another and comprising:
       a first query node at a primary site and comprising a first computer processor; and
       a second query node at a first secondary site and comprising a second computer processor,
    wherein the first query node is configured to:

select a first archive package (AP) from a plurality of APs;
make a determination that the first AP requires a transformation;
generate, based on the determination, an archive replica package (ARP) from a first transformed AP,
  wherein the first transformed AP is obtained by processing the first AP;
transmit the ARP to the second query node;
receive a first query request from the second query node;
execute the first query request to obtain the first AP;
process the first AP to obtain a first record; and
transmit, in response to the first query request, the first AP and the first record to the second query node.

17. The system of claim 16, further comprising:
a plurality of clients operatively connected to the plurality of query nodes,
wherein the second query node submits the first query request to the first query node in response to receiving a second query request for the first record from a client of the plurality of clients, and based on a determination that the first record is not stored on the second query node.

18. The system of claim 16, further comprising:
a third query node of the plurality of query nodes, at a second secondary site and comprising a third computer processor,
wherein the first query node is further configured to:
receive a second query request from the third query node;
execute the second query request to obtain a second AP;
process the second AP to obtain a second record; and
transmit, in response to the second query request, the second AP and the second record to the third query node.

19. A non-transitory computer readable medium (CRM) comprising computer readable program code, which when executed by a computer processor, enables the computer processor to:
select, by a first query node at a primary site, a first archive package (AP) from a plurality of APs;
make a determination that the first AP requires a transformation;
generate, based on the determination, an archive replica package (ARP) from a first transformed AP,
  wherein the first transformed AP is obtained by processing the first AP;
transmit the ARP to a second query node at a first secondary site;
receive a first query request from the second query node at the first secondary site;
execute the first query request to obtain the first AP;
process the first AP to obtain a first record; and
transmit, in response to the first query request, the first AP and the first record to the second query node at the first secondary site.

* * * * *